April 18, 1933. B. S. BURRELL 1,903,774
SCREENER EQUIPPED PIPE LINE
Filed June 17, 1931 2 Sheets-Sheet 2
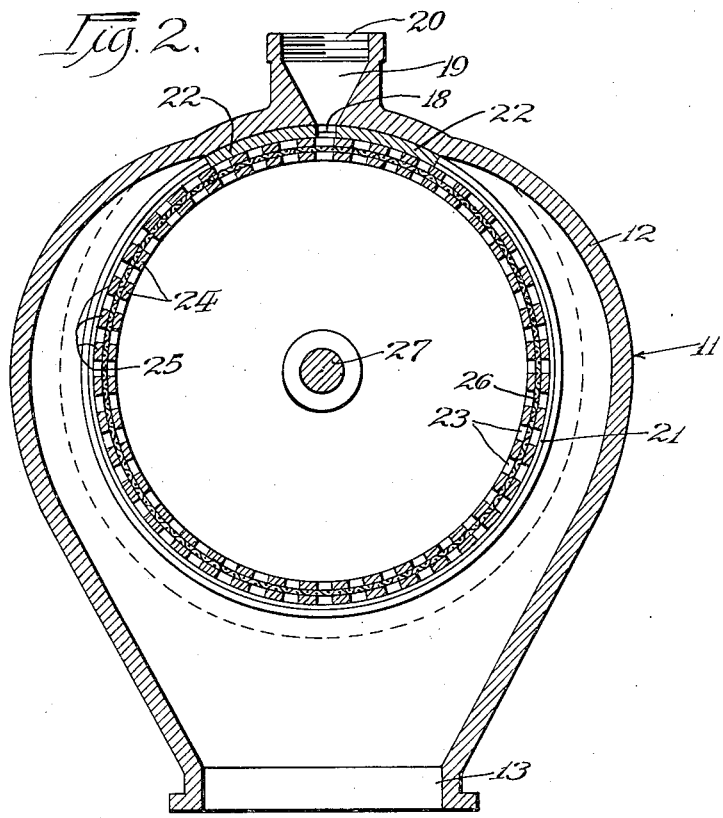
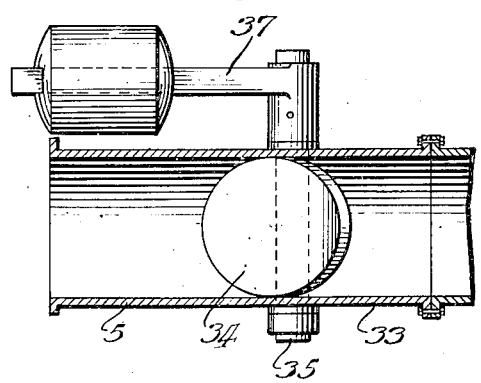
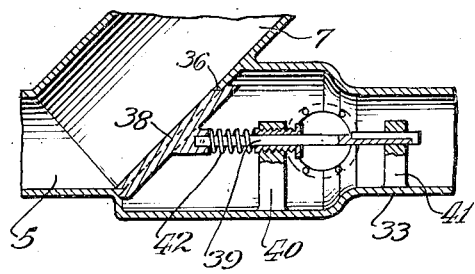
Inventor:
Benjamin S. Burrell,
By Dyrenforth, Lee, Chritton & Wiles,
Attorneys Patented Apr. 18, 1933

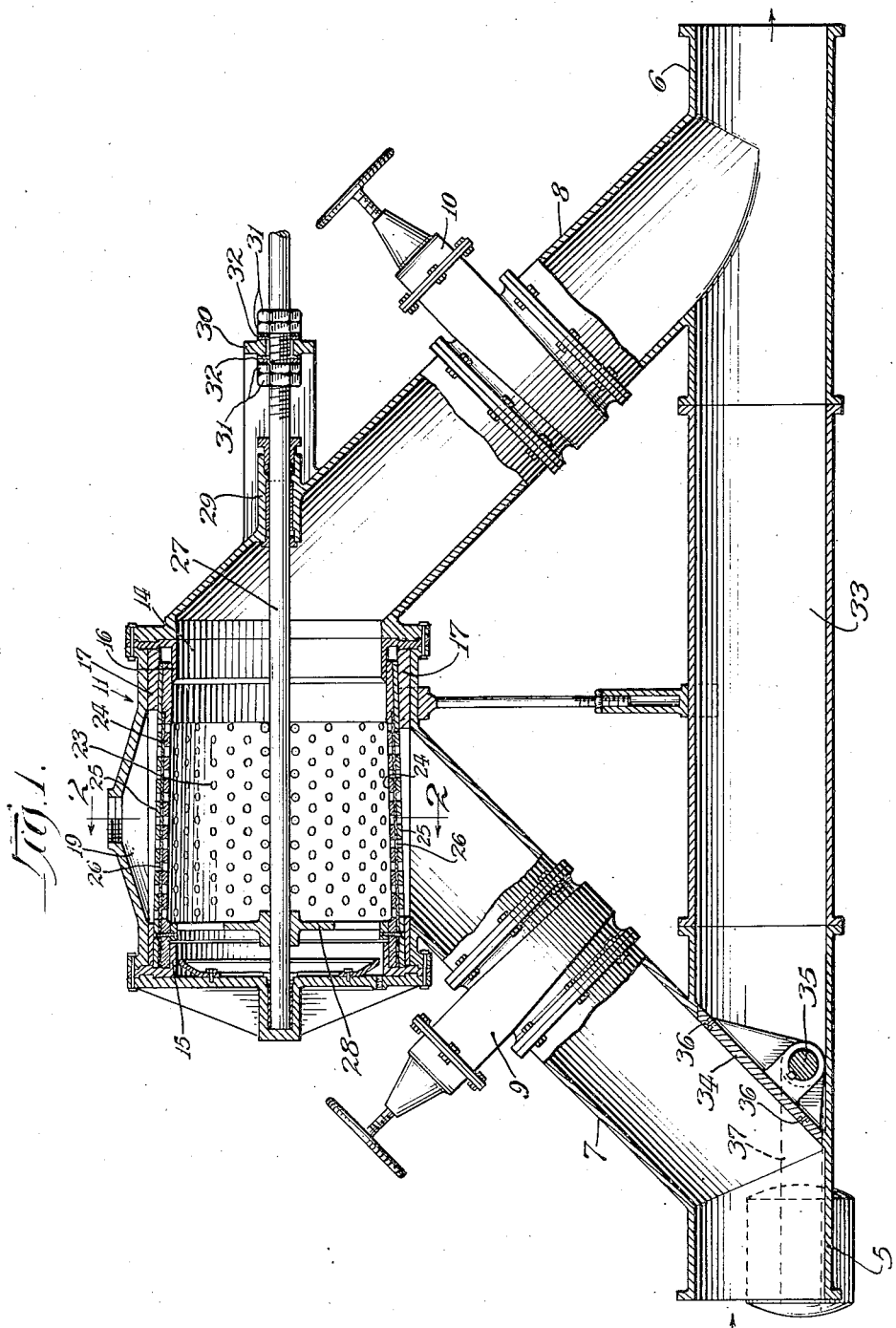

1,903,774

UNITED STATES PATENT OFFICE

BENJAMIN S. BURRELL, OF EAST CHICAGO, INDIANA

SCREENER EQUIPPED PIPE LINE

Application filed June 17, 1931. Serial No. 545,128.

My invention relates to pipe lines for conveying fluid, such as for example water, as from a source of dirty water supply to the point of use, having interposed therein apparatus, such as strainer apparatus for straining solid particles from the water, and which, should clogging thereof occur, would cause the flow of water to the point of use to be unduly interfered with.

My primary object is to provide means, in a system such as that above referred to, whereby should the course become clogged as for example by the clogging of a screening device therein, the flow of fluid will be at least partially diverted, and preferably automatically around the zone of clogging and into the line and thus maintain the desired volumetric flow of fluid to the point of use, which is of major importance especially in industrial water supply installations.

Referring to the accompanying drawings:

Figure 1 is a view in side elevation of a portion of a water supply system having screening means and embodying my invention.

Figure 2 is an enlarged section taken at the line 2—2 on Fig. 1 and viewed in the direction of the arrows.

Figure 3 is a plan sectional view of a valve forming a part of the apparatus of Fig. 2; and Figure 4 a similar view of a modification of the valve of Fig. 3.

Referring to the particular illustrated embodiment of my invention, 5 and 6 represent pipes forming portions of a water main for conducting water to the point of use. The pipes 5 and 6 are formed with upwardly directed converging extensions 7 and 8, respectively, shown as provided with gate valves 9 and 10, respectively.

The pipe 7 opens at its upper end into the inlet of a screening, or filtering, device represented generally at 11 and provided for the purpose of removing solid matter from the water, and the upper end of the pipe 8 opens into the outlet of the device 11.

So far as my present invention is concerned the form of the device 11 is immaterial that shown being merely illustrative of a form which may be employed and comprising a casing 12 in communication at an opening 13 in its side wall with the pipe 7 and at its open end 14 with the pipe 8.

The casing is provided at its opposite ends with rings 15 and 16 adjacent the closed end of the casing and at the outlet thereof, respectively, and a tapering shell 17 substantially coextensive with the length of the casing and surrounding the rings 15 and 16 in concentric spaced apart relation, the shell 17, which conformingly fits the casing 12 at the upper end of the latter as shown in Fig. 2 but is spaced therefrom throughout the remainder of its periphery, containing an elongated port 18 at its upper portion registering with a chamber 19 in the casing and having an outlet 20, and having its peripheral wall entirely cut away between its ends as represented at 21, except for the part represented at 22 and containing the port 18.

The screening device also comprises an interstitial screening drum 23 rotatably mounted in the shell 17 with its ends extending into the annular spaces presented by the ends of the shell and the rings 15 and 16 which it surrounds, the drum 23 being shown as formed of an inner shell 24 and an outer shell 25 both perforated as shown and an interposed annular member 26 of screening material as for example wire mesh.

The shells 24 and 25 and member 26 are rigdly secured together to rotate as a unit and are shown as driven by a shaft 27 connected with the drum 23 by a spider 28, the shaft being journaled at one end in the closed end of the casing 12 and extending at its opposite end through a stuffing box 29 in the pipe 8, force for rotating the shaft being exerted against the protruding end of the shaft by any suitable means. The shaft 27 is shown as extending freely through an opening in a bracket 30 with nuts 31 and washers 32 thereon at opposite sides of the bracket to serve in conjunction with the latter to resist end thrust on the shaft.

It will be understood from the foregoing that the water flowing in the pipe 7 under pressure enters the casing 12 and is forced through the screening member 26 into the interior of the drum 23 and discharged through the end of the drum into the pipe 8 under pressure and thence to the point of use. In such flow the solid particles in the water are deposited upon the outside surface of the screen-member 26 and are carried in the continuous rotation of the drum 23 into registration with the port 18, the pressure of the clear water in the drum producing a flow of water radially outwardly through the screening member 26 thus removing the deposit on the outer surface of the member 26 and washing it away through the outlet 20 to waste, the screening device thus being self-cleaning.

It is necessary in such character of installations to insure a substantially constant volume of flow to the point of use at all times preferably of cleaned water, and to provide for such constant flow even should the flow of clean water become reduced as by clogging or impairment of the screening device, and furthermore to admit of access to the interior of the screening device for cleaning or repair without reducing the flow of water through pipe 6. This is provided for in accordance with my invention by providing a by-pass 33 around the screening device 11 which opens into the pipes 5 and 6 and which is normally closed but which serves as a course through which uncleaned water flows to the pipe 6 to maintain the desired volumetric flow, the by-pass being controlled by a valve preferably of such construction that it remains closed during the normal functioning of the screening device but which automatically opens when abnormal back pressure becomes built up in the pipe 7 as for example by the clogging of the screening device, and becomes restored to closed position when the back pressure again lowers to its normal operating pressure.

In Figs. 1 and 3 one form of such automatic valve is represented this valve comprising a plate 34 secured to a rock shaft 35 extending crosswise through the pipe 33 and normally seating against the wall of an opening 36 in the side of the pipe 7 as by force applied thereto by a weighted arm 37 secured to the shaft 35, the valve 34 automatically rocking away from its seat should the back pressure referred to become built up in the pipe 7. The valves 9 provide means for closing the screening device 11 to the water pressure should access to this device become necessary.

The valve plate 34 is shown as extending at an angle to the flow of water as it discharges from pipe 5 into pipe 7 and thus the action of the water against it maintains it in clean condition.

The valve of Fig. 4 constitutes a modification of the valve of Figs. 1 and 3 controlling flow of water into the pipe 33 under the conditions above explained of valve 34, this valve, which is of the slidable type, comprising a valve plate 38 having a stem 39 slidable in supports 40 and 41 and normally held in seated position at the opening 36 in pipe 7 by a coil spring 42 surrounding the stem 39 and compressed between the plate 38 and the support 40.

While I have illustrated and described certain particular embodiments of my invention, I do not wish to be understood as intending to limit it thereto as the invention may be embodied in other construction of apparatus and those shown variously modified and altered without departing from the spirit of my invention.

What I claim as new, and desire to secure by Letters Patent, is:

1. A fluid course having means therein for conditioning the fluid, a by-pass around said means, and a valve normally closing said by-pass to the flow of fluid therethrough and so positioned that the fluid sweeps against it in flowing to said means for keeping the face of the valve clean and operating automatically to open said by-pass for by-passing the fluid around said first-named means upon the building up of a predetermined back pressure in the portion of the course leading to said first-named means.

2. A fluid course having means therein for conditioning the fluid, a by-pass around said means, and a rock valve normally closing said by-pass to the flow of fluid therethrough and across which the fluid sweeps in passing to said means for keeping the face of the valve clean and operating automatically to open said by-pass for by-passing the fluid around said first-named means upon the building up of a predetermined back pressure in the portion of the course leading to said first-named means.

3. A fluid course having means therein for conditioning the fluid, a by-pass around said means, and a reciprocably mounted spring pressed valve normally closing said by-pass to the flow of fluid therethrough and across which the fluid sweeps in passing to said means for keeping the face of the valve clean and operating automatically to open said by-pass for by-passing the fluid around said first-named means upon the building up of a predetermined back pressure in the portion of the course leading to said first-named means.

4. A fluid course having means therein for conditioning the fluid and having an opening in its side wall between the inlet of said course and said means, a by-pass around said means and communicating with said opening, and a valve normally closing said by-pass to the flow of fluid therethrough and operating automatically to open said by-pass for by-passing the fluid around said means upon the building up of a predetermined back pressure in the portion of said course leading to said means, the face of said valve in the closed position thereof being disposed substantially in the plane of the wall of said course at said opening thereby to avoid the presentation of a dirt collecting pocket, or pockets.

5. A fluid course having means therein for conditioning the fluid, said course in advance of said means comprising conduit portions disposed at an obtuse angle to each other, a by-pass around said means and opening through a side of the one of said conduit portions nearest said means, and a valve adjacent the connection between said by-pass and said last-referred-to conduit portion and normally closing said by-pass to the flow of fluid therethrough and operating automatically to open said by-pass for by-passing the fluid around said means upon the building up of a predetermined back pressure in the portion of said course leading to said means, said valve forming a wall portion of said last-referred-to conduit portion disposed substantially in line with the flow of fluid through the other of said conduit portions, whereby the fluid impinges against the face of said valve.

6. A fluid course having means therein for conditioning the fluid, said course in advance of said means comprising conduit portions disposed at an obtuse angle to each other, a by-pass around said means and opening through a side of the one of said conduit portions nearest said means, and a valve adjacent the connection between said by-pass and said last-referred-to conduit portion and normally closing said by-pass to the flow of fluid therethrough and operating automatically to open said by-pass for by-passing the fluid around said means upon the building up of a predetermined back pressure in the portion of said course leading to said means, said valve forming a wall portion of said last-referred-to conduit portion disposed substantially in line with the flow of fluid through the other of said conduit portions whereby the fluid impinges against the face of said valve, the face of said valve in the closed position thereof being disposed substantially in the plane of the wall of the conduit portion through which said by-pass opens, thereby to avoid the presentation of a dirt collecting pocket, or pockets.

BENJAMIN S. BURRELL.